United States Patent
Li et al.

(10) Patent No.: US 12,341,392 B2
(45) Date of Patent: Jun. 24, 2025

(54) CONNECTION RING TERMINAL, CONNECTION RING, AND MOTOR

(71) Applicant: Schaeffler Technologies AG & Co. KG, Herzogenaurach (DE)

(72) Inventors: Lesheng Li, Shanghai (CN); Zedong Zhang, Suzhou (CN); Xingfu Zhou, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 259 days.

(21) Appl. No.: 18/032,301

(22) PCT Filed: Oct. 20, 2020

(86) PCT No.: PCT/CN2020/122091
§ 371 (c)(1),
(2) Date: Apr. 17, 2023

(87) PCT Pub. No.: WO2022/082412
PCT Pub. Date: Apr. 28, 2022

(65) Prior Publication Data
US 2023/0402893 A1 Dec. 14, 2023

(51) Int. Cl.
*H02K 3/50* (2006.01)

(52) U.S. Cl.
CPC ........... *H02K 3/50* (2013.01); *H02K 2203/06* (2013.01)

(58) Field of Classification Search
CPC ............................. H02K 3/50; H02K 2203/06

USPC .......................................................... 310/71
See application file for complete search history.

(56) References Cited

U.S. PATENT DOCUMENTS

| 5,006,765 A * | 4/1991 | Schmider ................. H02K 3/47 310/67 R |
| 5,350,960 A * | 9/1994 | Kiri ...................... H02K 5/1672 310/194 |
| 8,840,381 B2* | 9/2014 | Fukasaku ................ F04B 35/04 310/71 |
| 2006/0043805 A1* | 3/2006 | Bradfield ................. H02K 9/06 310/90 |
| 2012/0212089 A1* | 8/2012 | Sakurada ............... H02K 5/225 310/71 |
| 2014/0021815 A1 | 1/2014 | Tomita et al. |

FOREIGN PATENT DOCUMENTS

| CN | 1414672 A | 4/2003 |
| CN | 102782996 A | 11/2012 |
| CN | 103493342 A | 1/2014 |
| CN | 209562278 U | 10/2019 |
| JP | 2016208577 A | 12/2016 |

* cited by examiner

Primary Examiner — Rashad H Johnson

(57) ABSTRACT

A connection ring terminal. The connection ring terminal is used for connecting to a lead-out end of a connection ring of a motor; and the connection ring terminal comprises a main body and a connection part located at one end of the main body, wherein the connection part is used for surrounding the lead-out end at least in the circumferential direction of the lead-out end, such that the connection ring terminal can be positioned relative to the lead-out end in the radial and circumferential directions of the connection ring. A connection ring and a motor is also provided.

12 Claims, 5 Drawing Sheets

US 12,341,392 B2

CONNECTION RING TERMINAL, CONNECTION RING, AND MOTOR

CROSS-REFERENCE TO RELATED APPLICATIONS

This application is the U.S. National Phase of PCT Appln. No. PCT/CN2020/122091 filed Oct. 20, 2020, the entire disclosure of which is incorporated by reference herein.

TECHNICAL FIELD

The present disclosure relates to the field of motors, and in particular to connection rings and connection ring terminals of motors.

BACKGROUND

Taking a three-phase motor as an example, FIG. 1 and FIG. 2 show a schematic diagram of a possible partial structure of a connection ring of a motor.

The connection ring comprises three connection rings 20 and three connection ring terminals 10, and each connection ring 20 is connected to one connection ring terminal 10. The connection rings 20 are used for connecting to a stator winding, each connection ring 20 corresponds to current in one phase, and the connection ring terminals 10 are used for connecting to high-voltage leads of an external circuit.

In this solution, two lead-out ends 21 protruding along an axial direction are formed on each connection ring 20. The connection ring terminal 10 comprises a main body 11 and a connection part 12, and the connection part 12 is in the shape of a flat plate and is welded and fixed with the lead-out end 21; and the main body 11 extends toward an axial direction side of the connection ring 20, and an end of the main body 11 that is away from the connection part 12 has a screw hole 110.

Usually, during welding, it is necessary to position the connection ring terminal by means of an additional tooling, and the clamping position of the sip ring terminal 10 by the tooling is located, for example, on one side of the screw hole 110. The welding is, for example, laser welding.

However, the connection ring terminal 10 is typically deviated from a predetermined position after the welding is completed, resulting in a deviation of the position of the screw hole 110, due to, for example, positioning errors, high temperature during welding and residual stress of welding.

Also, the cost of laser welding is high. In addition, the connection ring terminal and the connection ring 20 are adhered only at a welding point, and the connection ring terminal 10 is caused to be easily detached from the connection ring 20 by being subjected to, for example, a shearing force in the radial direction.

SUMMARY

The present disclosure aims to overcome or at least alleviate the foregoing deficiency of the prior art, and provides a connection ring terminal, a connection ring and a motor with simple structures and high reliability.

According to a first aspect of the present disclosure, provided is a connection ring terminal, which is used for connecting to a lead-out end of the connection ring of the motor and comprises a main body and a connection part located at one end of the main body, wherein,
the connection part is used for surrounding the lead-out end at least in a circumferential direction of the lead-out end, such that the connection ring terminal can be positioned relative to the lead-out end in the radial and circumferential directions of the connection ring.

In at least one embodiment, the connection part comprises a peripheral wall part that is used for surrounding the lead-out end in the circumferential direction.

In at least one embodiment, the peripheral wall part is C-shaped in a cross section perpendicular to the axial direction of the connection ring.

In at least one embodiment, the peripheral wall part has a gap left in the circumferential direction.

For the connection ring having two lead-out ends, the gap is used for being arranged between the two lead-out ends.

In at least one embodiment, the connection part is also used for abutting against the lead-out end at an axial direction end of the lead-out end, such that the connection ring terminal can be positioned relative to the lead-out end in the axial direction.

In at least one embodiment, the connection part further comprises an end wall part that is arranged at one axial direction end of the peripheral wall part and is used for abutting against the lead-out end in the axial direction.

In at least one embodiment, the connection part is formed through a bending process.

According to a second aspect of the present disclosure, provided is a connection ring, which comprises one or more connection rings, and each of the connection rings has one or more lead-out ends, wherein,
each of the connection rings is connected to at least one connection ring terminal according to the present disclosure at the lead-out end.

In at least one embodiment, an end of the lead-out end that is suspended in the axial direction of the connection ring does not exceed the connection part of the connection ring terminal in the axial direction.

In at least one embodiment, the connection ring and the connection ring terminal are connected through a welding process.

In at least one embodiment, the connection ring the connection ring terminal are connected through resistance welding.

According to a third aspect of the present disclosure, provided is a motor, which comprises a stator winding and high-voltage leads, wherein the motor further comprises the connection ring according to the present disclosure, the connection ring of the connection ring is connected to the stator winding, and the connection ring terminal of the connection ring is connected to the high-voltage leads.

The connection ring terminal according to the present disclosure has a simple structure and is convenient for being positioned with the connection ring.

The connection ring according to the present disclosure has a simple structure, high positional accuracy, low manufacturing cost and is not prone to be damaged.

The motor according to the present disclosure has the same advantages.

DETAILED DESCRIPTION

Exemplary embodiments of the present disclosure will be described below with reference to the attached drawings. It should be understood that these specific descriptions are only used to teach those skilled in the art how to implement the present disclosure, and are neither intended to be exhaustive of all possible variations of the present disclosure nor to limit the scope of the present disclosure.

Figure 1:
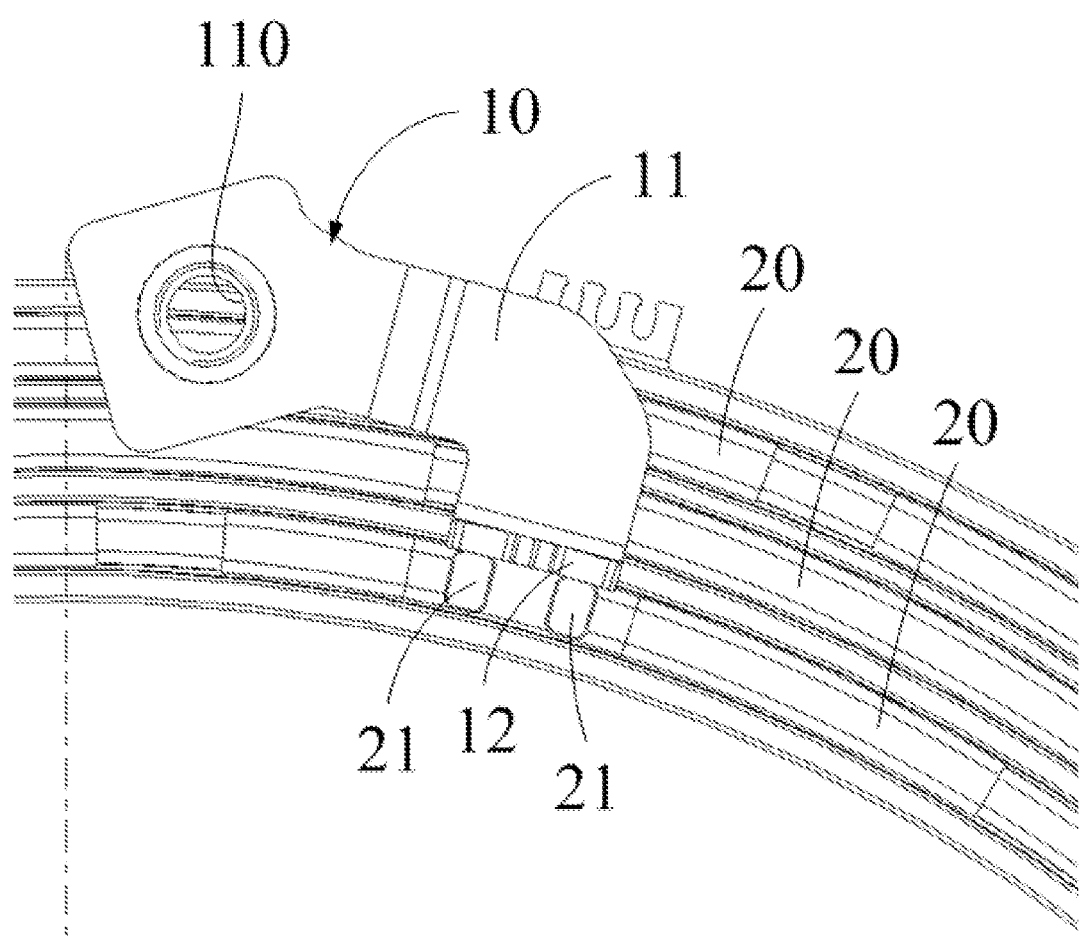
FIG. 1 is an axial schematic diagram of a possible partial structure of a connection ring.
Figure 2:
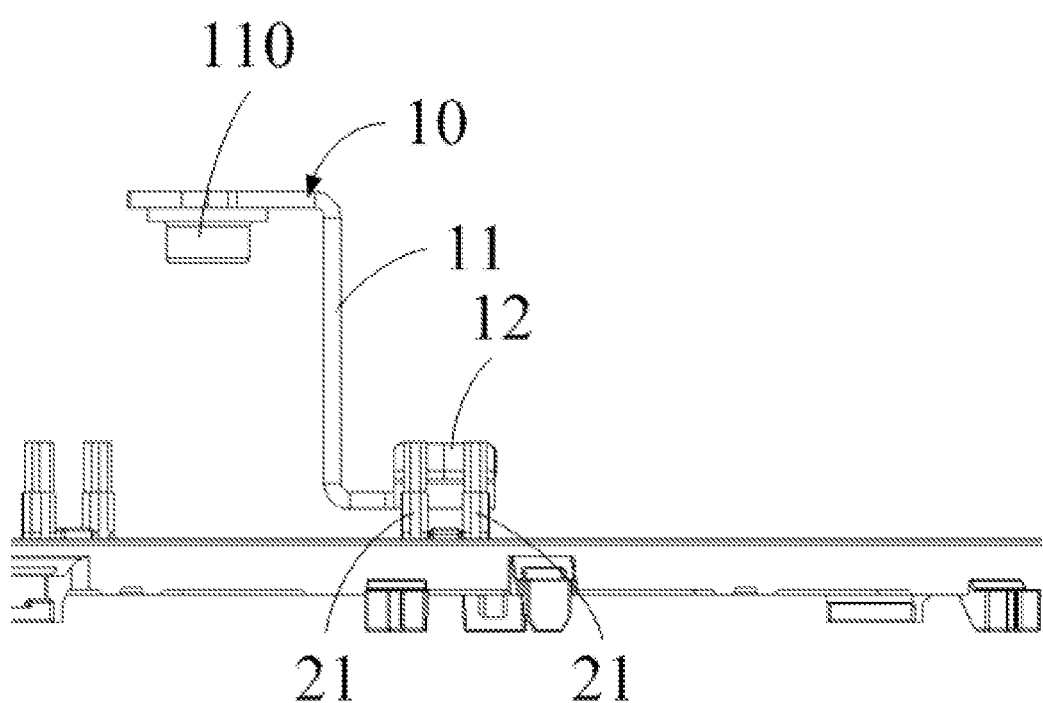
FIG. 2 is a schematic diagram of the connection ring in FIG. 1 viewed in a radial direction.
Figure 3:
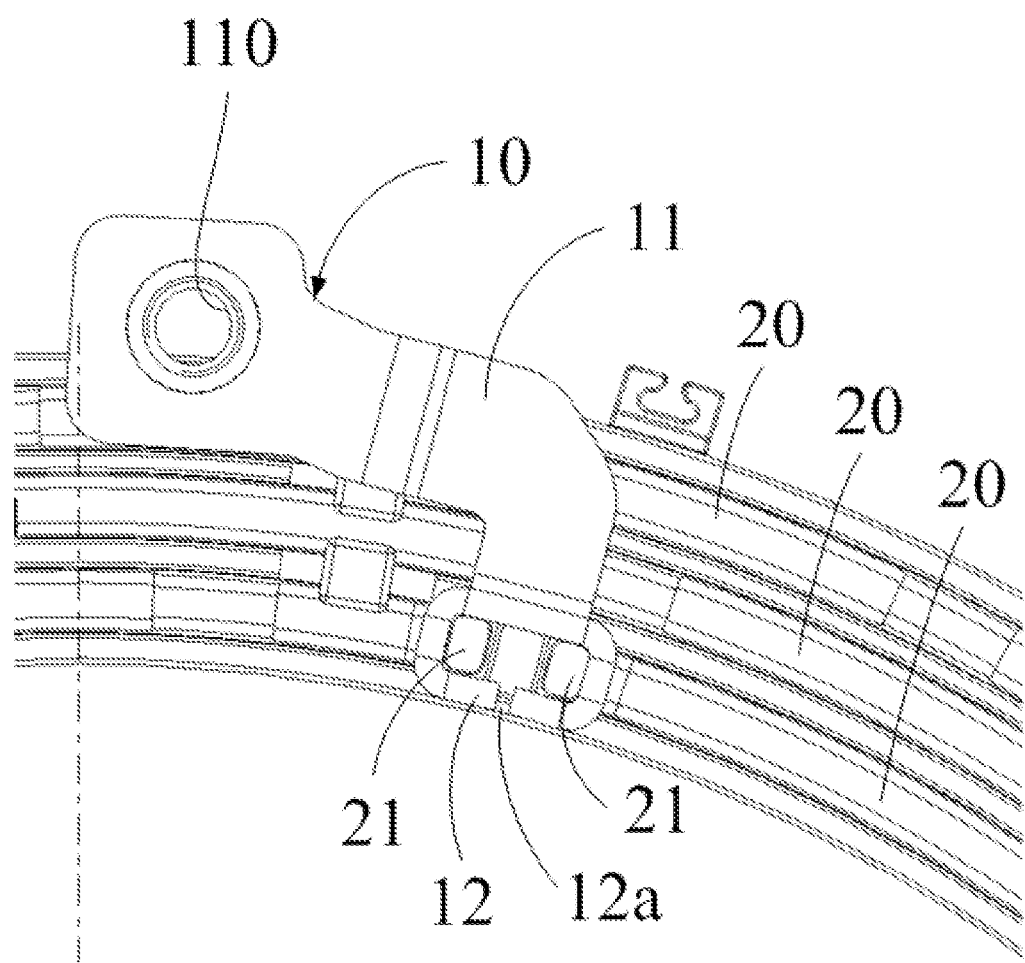
FIG. 3 is an axial schematic diagram of the partial structure of the connection ring according to an embodiment of the present disclosure.
Figure 4:
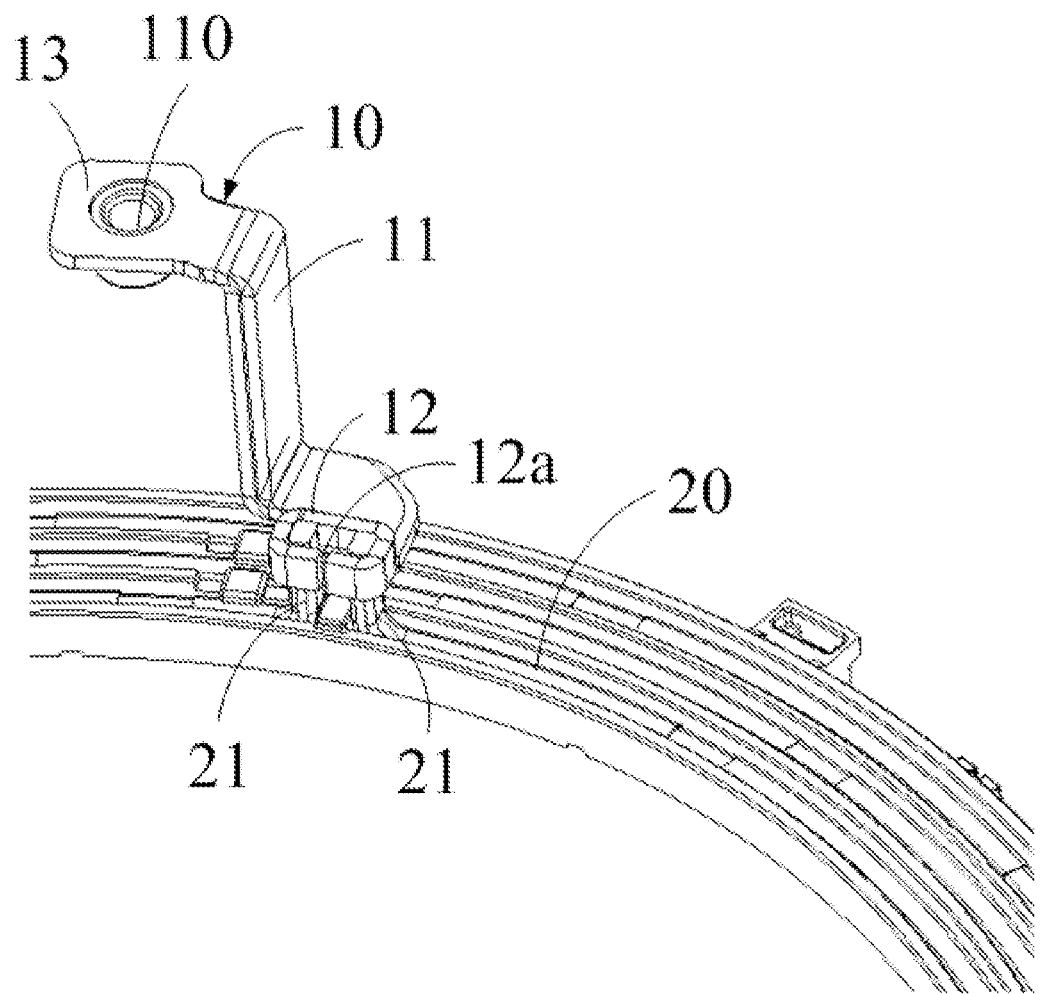
FIG. 4 is a perspective schematic diagram of the partial structure of the connection ring according to an embodiment of the present disclosure.
Figure 5:
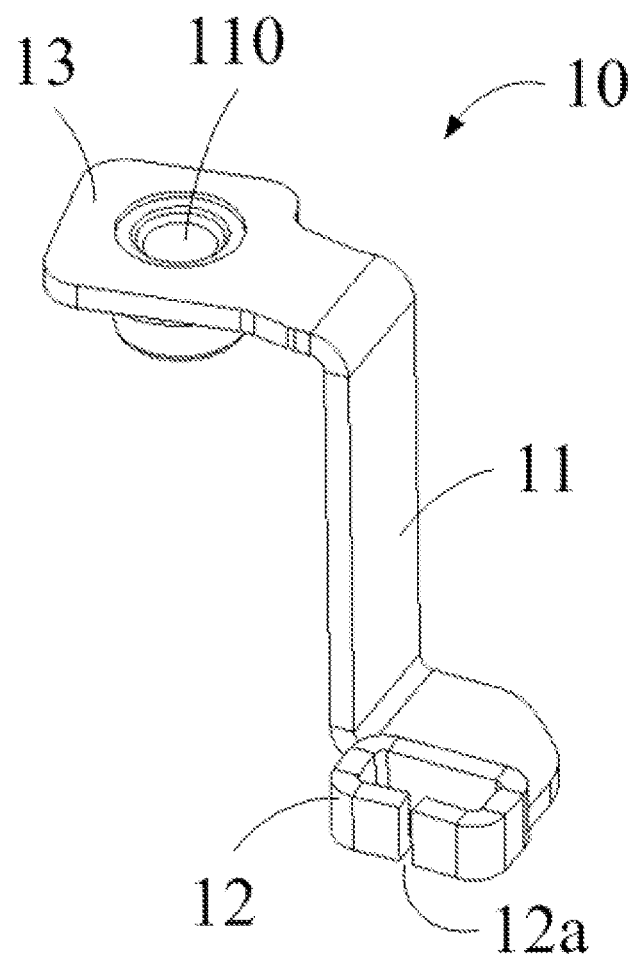
FIG. 5 is a schematic diagram of a connection ring terminal according to an embodiment of the present disclosure.

Referring to FIG. 3 to FIG. 5, taking a three-phase motor as an example, a motor, a connection ring and a connection ring terminal according to an embodiment of the present disclosure will be introduced.

The motor comprises a stator winding, the connection ring and high-voltage leads. The stator winding comprises three groups, i.e., a U-phase winding, a V-phase winding and a W-phase winding. Each phase winding is respectively used for connecting to one high-voltage lead, and the connection ring plays a role of connecting the winding and the high-voltage leads.

The connection ring is also referred to as a connection or a busbar, which comprises a connection ring terminal 10 and a connection ring 20. There may be three connection rings 20, and the three connection rings 20 are insulatively spaced apart from one other. Each connection ring 20 is connected to one connection ring terminal 10.

In this embodiment, the connection rings 20 are annular, and three connection rings 20 are arranged concentrically and are arranged concentrically with a stator of the motor.

Two lead-out ends 21 are formed on each connection ring 20. In this embodiment, the lead-out ends 21 are of a short cylindrical shape, protrude from an axial direction surface of one side of the connection ring 20, and extend along the axial direction of the connection ring 20.

The connection ring terminal 10 comprises a main body 11 and a connection part 12. The main body 11 is substantially strip-shaped, and the connection part 12 is located at one end of the main body 11. The main body 11 is used for connecting to the high-voltage leads, and the connection part 12 is used for connecting to the lead-out ends 21.

In this embodiment, the connection part 12 is C-shaped in a cross section perpendicular to the axial direction of the connection ring 20 and surrounds the two lead-out ends 21 on one connection ring 20, and the contour of an inner peripheral wall of the connection part 12 abutting against the lead-out ends 21 is the same as the contour of an outer peripheral wall of the lead-out ends 21 in shape.

Usually, the connection part 12 and the lead-out ends 21 form a firm connection by welding, and the connection part 12 that is substantially annular in this embodiment enables the connection ring terminal 10 to be roughly positioned relative to the lead-out ends 21 in a radial direction and a circumferential direction of the sip ring 20 before welding.

The connection part 12 that is C-shaped is formed with a gap 12a between two ends in the circumferential direction, and in this embodiment, the gap 12a is located between the two lead-out ends 21.

Optionally, the connection part 12 is formed by a sheet metal bending process. For example, materials for making the connection ring terminal 10 comprises copper, and the connection part 12 is formed by bending a punched copper sheet.

Since the connection part 12 may have the connection ring terminal 10 and the connection ring 20 positioned in the radial and circumferential directions, during welding, the connection ring terminal 10 only needs to be positioned in the axial direction of the connection ring 20 by means of a simple tooling. The tooling of positioning is simple in structure and low in cost.

Moreover, after the welding is completed, the connection part 12 may also share an external force on the connection ring terminal 10 in the radial and circumferential directions, such that the connection ring terminal 10 is not prone to be detached from the connection ring 20. This reduces the quality requirements of the welding process, so that the connection ring terminal 10 and the connection ring 20 may be welded using a low-cost welding method such as resistance welding.

Preferably, after the welding is completed, an end of the lead-out end 21 that is suspended in the axial direction of the connection ring 20 does not exceed the connection part 12 of the connection ring terminal 10 in the axial direction, for example, the end of the lead-out end 21 that is overhung in the axial direction is flush with an upper end of the connection part 12.

Preferably, an end of the main body 11 away from the connection part 12 is bent to form a lead connection end 13 parallel to a plane where the connection ring 20 is located, and a screw hole 110 is arranged on the lead connection end 13. The high-voltage leads may be fixed within the screw hole 110 by means of screws or bolts.

It should be appreciated that the present disclosure does not limit the specific shape and structure of the connection part 12 on the basis that the connection part 12 can position the connection ring terminal 10 in the radial and circumferential directions of the connection ring 20.

For example, the connection part 12 may form a complete annular shape without the gap 12a in the figure. Alternatively, the connection part 12 may have a plurality of gaps in the circumferential direction of the lead-out ends 21, that is, the connection part 12 is formed by individually bending a plurality of bending parts separated in the circumferential direction.

For another example, the connection part 12 may further comprise an end wall part capable of positioning the connection ring terminal 10 in the axial direction of the connection ring 20. That is, referring to FIG. 3 to FIG. 5, the connection part 12 in the figure only comprises a peripheral wall part surrounding the lead-out ends 21 in the circumferential direction. In order to realize a positioning in the axial direction at the same time, an end wall part is also connected to an axial direction end of the peripheral wall part in the figure, and the end wall part abuts against the lead-out end 21 at an axial direction end of the lead-out end 21.

The end wall part may completely cover the annular space surrounded by the peripheral wall part (that is, the entire connection part 12 is enabled in the shape of a cap), and may also only cover a partial area within the annular space surrounded by the peripheral wall part.

Some of the beneficial effects of the above-mentioned embodiments of the present disclosure are briefly described hereinafter.

The connection ring terminal 10 according to the present disclosure is simple in structure and can be conveniently connected and positioned with the lead-out end 21.

When the connection ring terminal 10 according to the present disclosure is connected to the connection ring 20, it is possible to use only a simple or even no tooling of positioning, and low-cost resistance welding and the like may be used in the welding process, resulting in low manufacturing cost. Compared to, for example, the laser welding, the resistance welding is less likely to cause deformation of the welded part, which may better ensure the positional accuracy of the connection ring terminal 10.

The connection ring terminal 10 according to the present disclosure has an accurate positioning and a firm connection with the connection ring 20, and is not prone to be detached therefrom.

It should be understood that the above-mentioned embodiments are exemplary only and are not intended to limit the present disclosure. Those skilled in the art can make various modifications and changes to the above-mentioned embodiments according to the teaching of the present disclosure without departing from the scope of the present disclosure. For example, when the winding phase of the motor is not three-phase, the number of the connection rings may be not three either, but other numbers.

The present disclosure does not limit the number of the lead-out ends on each connection ring 20, which may be one or more than two, for example.

Each connection ring 20 may also be connected to more than one connection ring terminal 10.

Besides the bending process, the connection part 12 can also be formed by other processes such as punching.

The shape of the connection part 12 may also be eventually formed in the process of being connected to the lead-out end 21. For example, the connection part 12 can be in the form of a ring with a larger inner diameter before being connected to the lead-out end 21. In the process of sleeving the connection part 12 to the lead-out end 21, the connection part 12 is deformed in a direction perpendicular to the axial direction by using a tool, such that the connection part closely abuts against an outer periphery of the lead-out end 21.

The connection ring terminal 10 and the connection ring 20 may also be connected by the laser welding or the like.

LIST OF REFERENCE NUMERALS

10 Connection ring terminal;
11 Main body;
110 Screw hole;
12 Connection part;
12a Gap;
13 Lead connection end;
20 Connection ring;
21 Lead-out end.

The invention claimed is:

1. A connection ring terminal used for connecting to a lead-out end of a connection ring of a motor, comprising:
a main body and a connection part located at one end of the main body, wherein,
the connection part is configured for surrounding the lead-out end at least in a circumferential direction of the lead-out end, such that the connection ring terminal can be positioned relative to the lead-out end in a radial direction and the circumferential direction of the connection ring.

2. The connection ring terminal according to claim 1, wherein the connection part comprises a peripheral wall part configured for surrounding the lead-out end in the circumferential direction.

3. The connection ring terminal according to claim 2, wherein the peripheral wall part is C-shaped in a cross section perpendicular to an axial direction of the connection ring.

4. The connection ring terminal according to claim 2, wherein the peripheral wall part has a gap left in the circumferential direction, and for the connection ring having two lead-out ends, the gap is configured to be arranged between the two lead-out ends.

5. The connection ring terminal according to claim 2, wherein the connection part further comprises an end wall part that is arranged at one axial direction end of the peripheral wall part and abuts against the lead-out end in the axial direction.

6. The connection ring terminal according to claim 1, wherein the connection part abuts against the lead-out end at an axial direction end of the lead-out end, such that the connection ring terminal can be positioned relative to the lead-out end in the axial direction.

7. The connection ring terminal according to claim 1, wherein the connection part is formed by a bending process.

8. A connection ring for a motor, comprising:
one or more connection rings, each of the connection rings having one or more lead-out ends, wherein
each of the connection rings is connected to at least one connection ring terminal at the lead-out end, the connection ring terminal including a main body and a connection part located at one end of the main body, wherein the connection part surrounds the lead-out end at least in a circumferential direction of the lead-out end, such that the connection ring terminal can be positioned relative to the lead-out end in a radial direction and the circumferential direction of the connection ring.

9. The connection ring according to claim 8, wherein an end of the lead-out end that is suspended in an axial direction of the connection ring does not exceed the connection part of the connection ring terminal in the axial direction.

10. The connection ring according to claim 8, wherein the connection ring is connected to the connection ring terminal through a welding process.

11. The connection ring according to claim 8, wherein the connection ring is connected to the connection ring terminal through resistance welding.

12. A motor, comprising a stator winding and high-voltage leads, wherein the motor further comprises a connection ring according to claim 8, the connection ring is connected to the stator winding, and the connection ring terminal of the connection ring is connected to the high-voltage leads.

* * * * *